W. C. HARTMANN.
CREAM SEPARATOR.
APPLICATION FILED MAY 4, 1908.
913,006.
Patented Feb. 23, 1909.
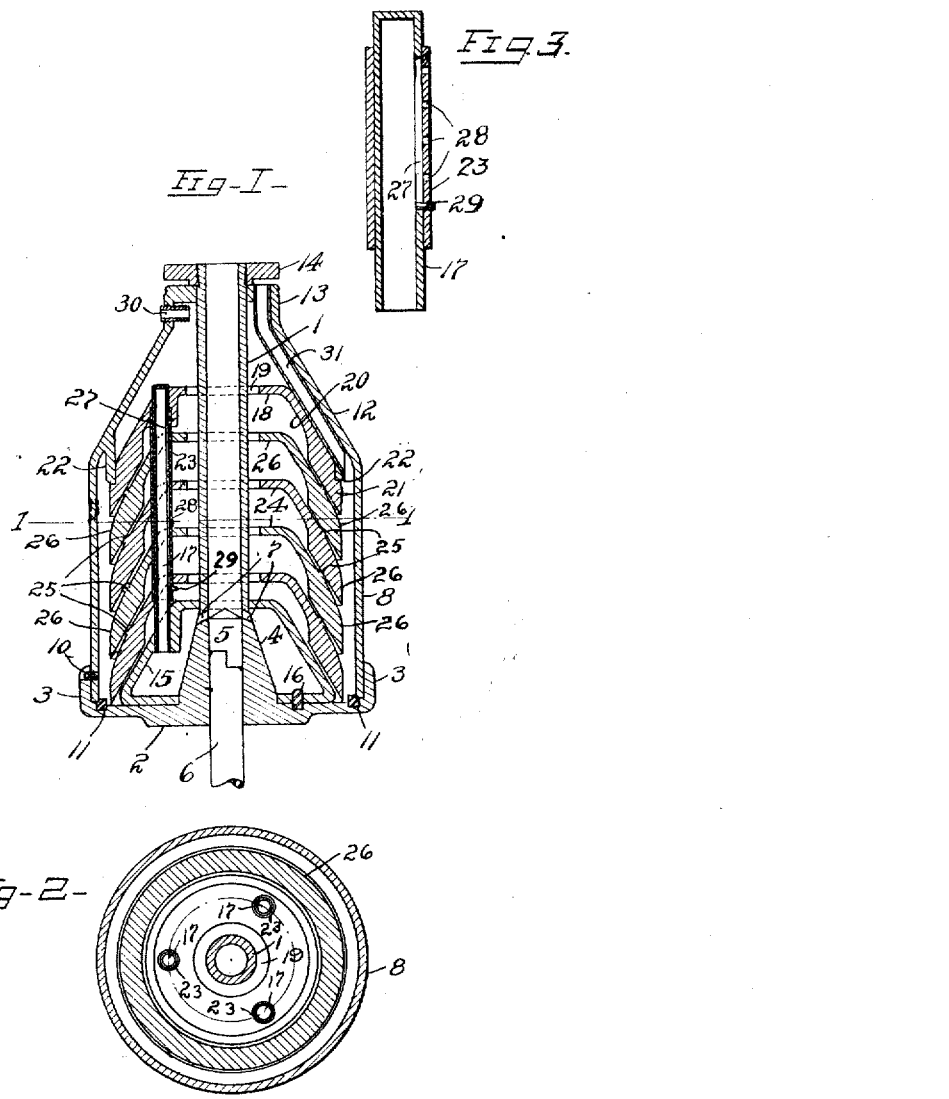
WITNESSES
Walter A. Greenburg
Anna M. Mayer
INVENTOR
WILLIAM C. HARTMANN
BY Barthel & Barthel
ATTORNEYS

UNITED STATES PATENT OFFICE.

WILLIAM C. HARTMANN, OF LANSING, MICHIGAN, ASSIGNOR, BY DIRECT AND MESNE ASSIGNMENTS, TO HARTMANN CREAM SEPARATOR COMPANY, OF LANSING, MICHIGAN, A CORPORATION OF MICHIGAN.

CREAM-SEPARATOR.

No. 913,006.  Specification of Letters Patent.  Patented Feb. 23, 1909.

Application filed May 4, 1908. Serial No. 430,650.

*To all whom it may concern:*

Be it known that I, WILLIAM C. HARTMANN, a citizen of the United States of America, residing at Lansing, in the county of Ingham and State of Michigan, have invented certain new and useful Improvements in Cream-Separators, of which the following is a specification, reference being had therein to the accompanying drawings.

This invention relates to a centrifugal cream separator bowl, and especially to certain arrangements of the lining increasing the efficiency of the action, and the ease with which it may be cleaned without disturbing the adjustment.

The invention consists in the matters hereinafter set forth, and more particularly pointed out in the appended claims.

In the drawings, Figure 1 is a view in longitudinal section of a cream separator bowl and liner embodying features of the invention. Fig. 2 is a view in section on line 1—1 of Fig. 1. Fig. 3 is a view in detail of a distributing pipe.

Referring to the drawings and more especially to Figs. 1 and 2, a central tubular stem 1 which constitutes the "fullmilk" inlet duct, terminates in a flat base 2 with a rim 3, the stem itself being flared to form a conical boss 4. The tube is closed at its lower end by a stub shaft 5 with shouldered end adapted to couple with the upper end of a main shaft 6. The tube has inclined radial discharge ducts 7 near the upper end of the boss 4. A cylindrical casing 8 which forms the body of the bowl is retained on the base 2 by the rim 3, a radial pin 10 or lug on the casing engaging a notch in the rim to prevent inter-rotation of the parts, and a packing ring 11 in a channel in the base face sealing the joint between it and the cylinder end. The upper part 12 of the casing is conical and its neck 13 is centrally apertured to form a slip joint with the tubular stem 1, a clamping collar 14 in screw-threaded engagement with the stem holding the parts together.

A conoidal distributing chamber 15 is removably seated on the base 2 concentric with the boss 4, a dowel pin 16 or the like preventing its rotation. A series of regularly disposed discharge pipes 17 closed at the upper ends, extend from the upper end of the distributing chamber well up into the conical top of the casing, parallel to the stem 1 and are secured at their lower ends to the distributing chamber.

A liner disk 18 having a central aperture 19 larger than the central stem 1 and a conical flange 20 with wide, flat thickened rim 21 is slightly counterbored on its outer face to be seated tightly against an inner annular flange 22 formed integrally on the conical top 12 of the casing, a series of tubular posts 23 secured in the underside of the top disk in telescopic engagement with the pipes 17 holding the disk in place. A number of liner disks 24 are interposed between the distributing chamber 15 and the outer or cap disk 18 to which they correspond in shape, spacing lugs 25 holding the rims 26 separated by narrow intervals. A slot 27 extending nearly the length of each pipe 17 adjacent the center stem 1 registers with discharge holes 28 in the posts 23, each hole lying between a pair of the liner disks. A pin 29 in each post sliding in the tube slot limits their relative longitudinal movements when separated for purposes of cleaning. A cream outlet nipple 30 screw-threaded or otherwise longitudinally adjustable in the neck 13 of the casing, and a milk outlet pipe 31 extending from the outer rims of the liner disk up through the casing top complete the cup.

In operation, the full milk enters the distributing chamber and is thrown out of the post apertures against the liner disks, the milk passing to the casing wall and the cream collecting around the stem. By adjusting the cream outlet in or out, the cream delivered may be made more or less free from milk. By unscrewing the clamping collar and removing the casing, the liner disks may be separated by drawing the posts off the tubes as far as the stop pins allow, so that they may be readily cleaned while they are readily turned to adjusted position. The wide space between the inner bodies of the disks and the narrow intervals between the thickened rims, together with the shoulder formed by the rims, aid in making complete separation between the cream and milk. The purpose of the telescopic tubes 17 and 23 is to permit the separation of the liner disks when the bowl is taken apart for the purpose of cleaning and yet not have the disks so that they may become entirely separated and lost or else not reassembled in proper order when taken apart for cleaning.

What I claim as my invention is:—

1. A cream separator bowl comprising a hollow spindle with lateral outlets near its closed lower ends and a disk base below the outlets, a conoidal distributing chamber on the base around the stem and its outlets, a cylindrical casing removably secured concentric with the stem on the base, a series of discharge pipes from the distributing chamber parallel to the stem, a liner consisting of an outer cap disk supported on tubular posts each in telescopic engagement with a discharge pipe, a stop, limiting the movement of each post on the companion pipe, a plurality of conical disks in spaced relation movable longitudinally on the posts concentric with the stem, a longitudinally adjustable cream outlet tube extending laterally from the upper end of the casing, and a milk tube through the casing top whose intake is close to the outer casing wall, said chamber pipes having outlets opening into the spaces between the lower disks.

2. A cream separator bowl comprising a hollow spindle with lateral outlets near its closed lower end and a disk base below the outlets, a conoidal distributing chamber on the base around the stem and its outlets, a cylindrical casing removably secured concentric with the stem on the base, a series of discharge pipes from the distributing chamber parallel to the stem, a liner consisting of an outer cap disk supported on tubular posts each in telescopic engagement with a discharge pipe having a plurality of outlets in register with a common discharge slot in the pipe, a stop limiting the movement of each post on the companion pipe, a plurality of conical disks in spaced relation movable longitudinally on the posts concentric with the stem, a longitudinally adjustable cream outlet tube extending laterally from the upper end of the casing, and a milk tube through the casing top, whose intake is close to the outer casing wall.

3. A cream separator bowl comprising a hollow spindle with lateral outlets near its closed lower end and a disk base below the outlets, a conoidal distributing chamber on the base around the stem and its outlets, a cylindrical casing removably secured concentric with the stem on the base, a series of discharge pipes from the distributing chamber parallel to the stem, a liner consisting of an outer cap disk supported on tubular posts each in telescopic engagement with a discharge pipe having a plurality of outlets in register with a common discharge slot in the pipe, a stop pin in each tube engaging the pipe slot and limiting the movement of each post in the companion pipe, a plurality of conical disks in spaced relation movable longitudinally on the posts concentric with the stem, a longitudinally adjustable cream outlet tube extending laterally from the upper end of the casing, and a milk tube through the casing top whose intake is close to the casing wall.

4. A cream separator bowl comprising a central hollow spindle provided at its lower closed end with lateral outlets, a disk base below the outlets integral with the stem, an annular packing ring on the base, a rim concentric therewith, a conoidal distributing chamber on the base around the stem and its outlets, a cylindrical casing having an open lower end seated on the packing ring with the rim and a conical upper end terminating in a neck having sliding engagement with the stem, a clamping collar screw-threaded on the stem bearing against the outer end of the neck, a series of discharge pipes from the distributing chamber parallel to the stem, a liner consisting of an outer cap disk supported on tubular posts each in telescopic engagement with a discharge pipe, having a plurality of outlets in register with a common discharge slot in the pipe, a stop pin in each tube engaging the pipe slot and limiting the movement of each post on the companion pipe, a plurality of conical disks in spaced relation movable longitudinally on the posts concentric with the stem, a longitudinally adjustable cream outlet tube extending laterally from the upper end of the casing, and a milk tube through the casing top whose intake is close to the outer casing wall.

In testimony whereof I affix my signature in presence of two witnesses.

WILLIAM C. HARTMANN.

Witnesses:
C. R. STICKNEY,
WALTER A. GREENBURG.